Aug. 6, 1963  G. J. POLLOCK ETAL  3,099,863
COMPOSITE PANEL ASSEMBLY
Filed Jan. 31, 1958  5 Sheets-Sheet 1
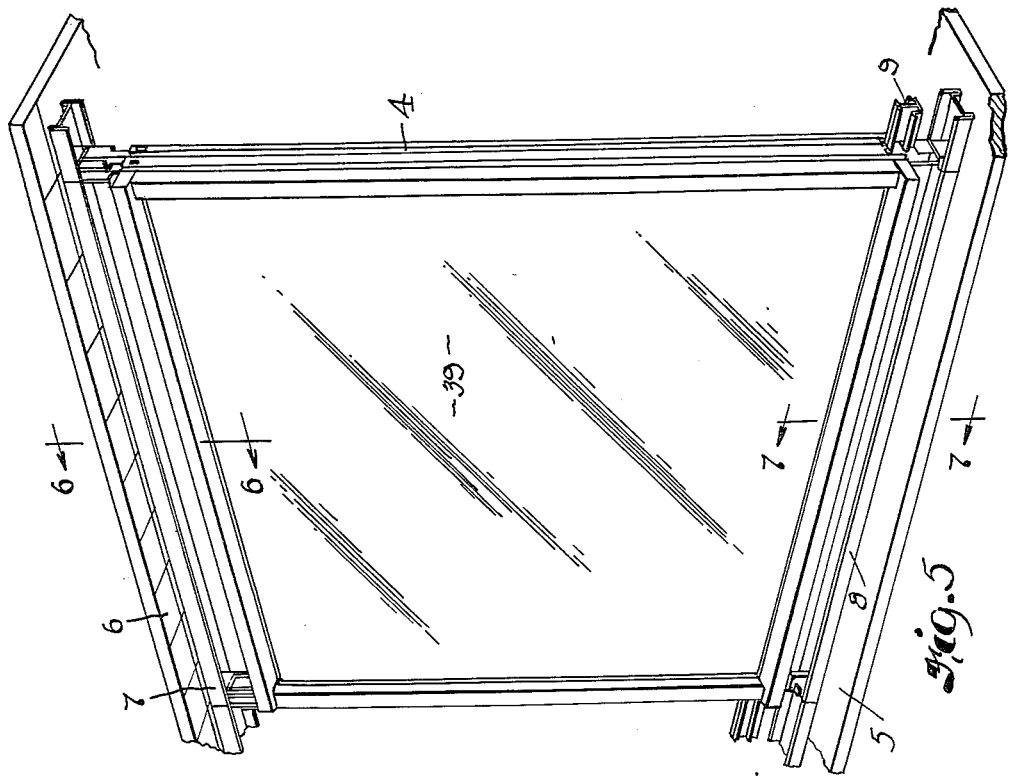
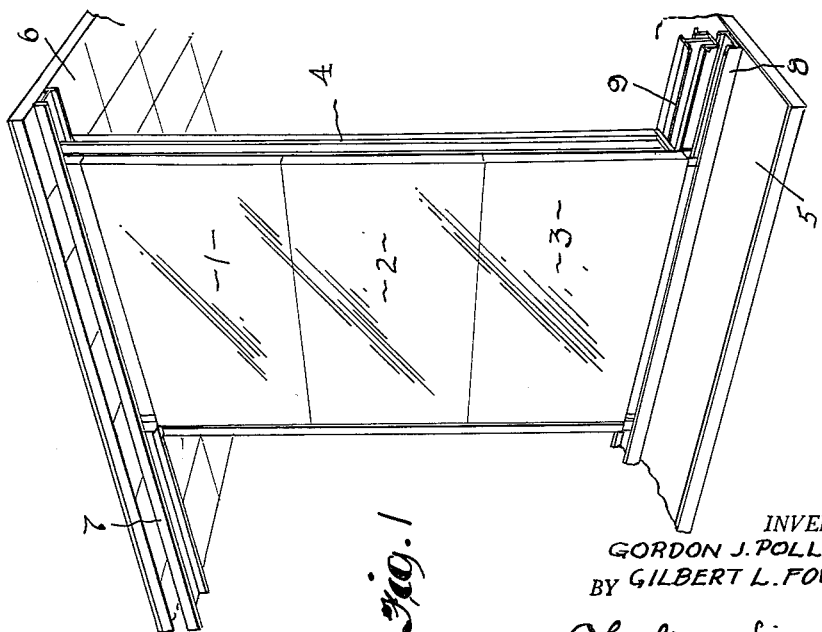
INVENTORS
GORDON J. POLLOCK &
BY GILBERT L. FOWLES.
Oberlin & Limbach
ATTORNEYS.

Aug. 6, 1963 G. J. POLLOCK ETAL 3,099,863
COMPOSITE PANEL ASSEMBLY
Filed Jan. 31, 1958 5 Sheets-Sheet 2

INVENTORS
GORDON J. POLLOCK &
BY GILBERT L. FOWLES.

Oberlin & Limbach
ATTORNEYS.

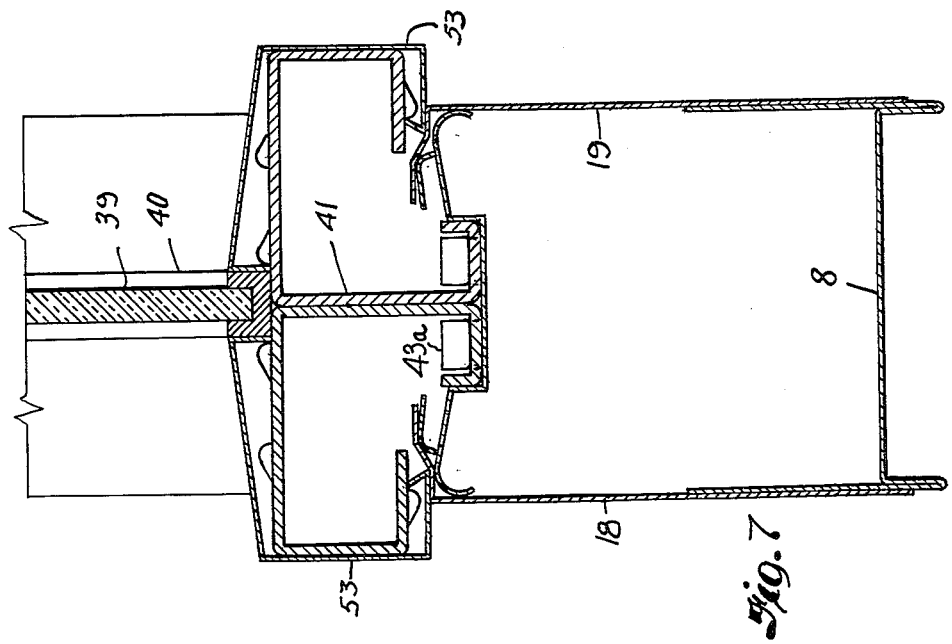
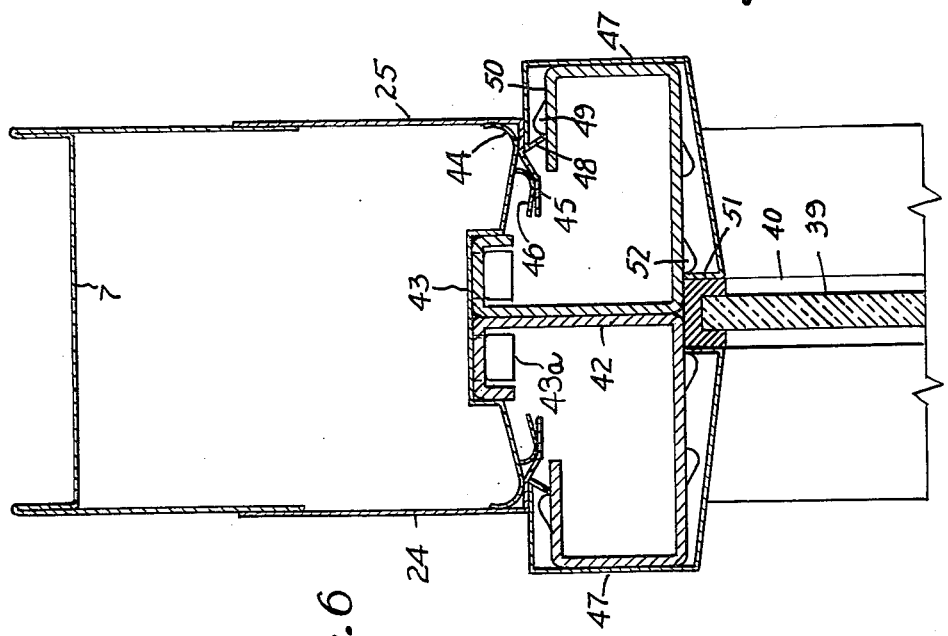

Aug. 6, 1963 G. J. POLLOCK ETAL 3,099,863
COMPOSITE PANEL ASSEMBLY
Filed Jan. 31, 1958 5 Sheets-Sheet 5
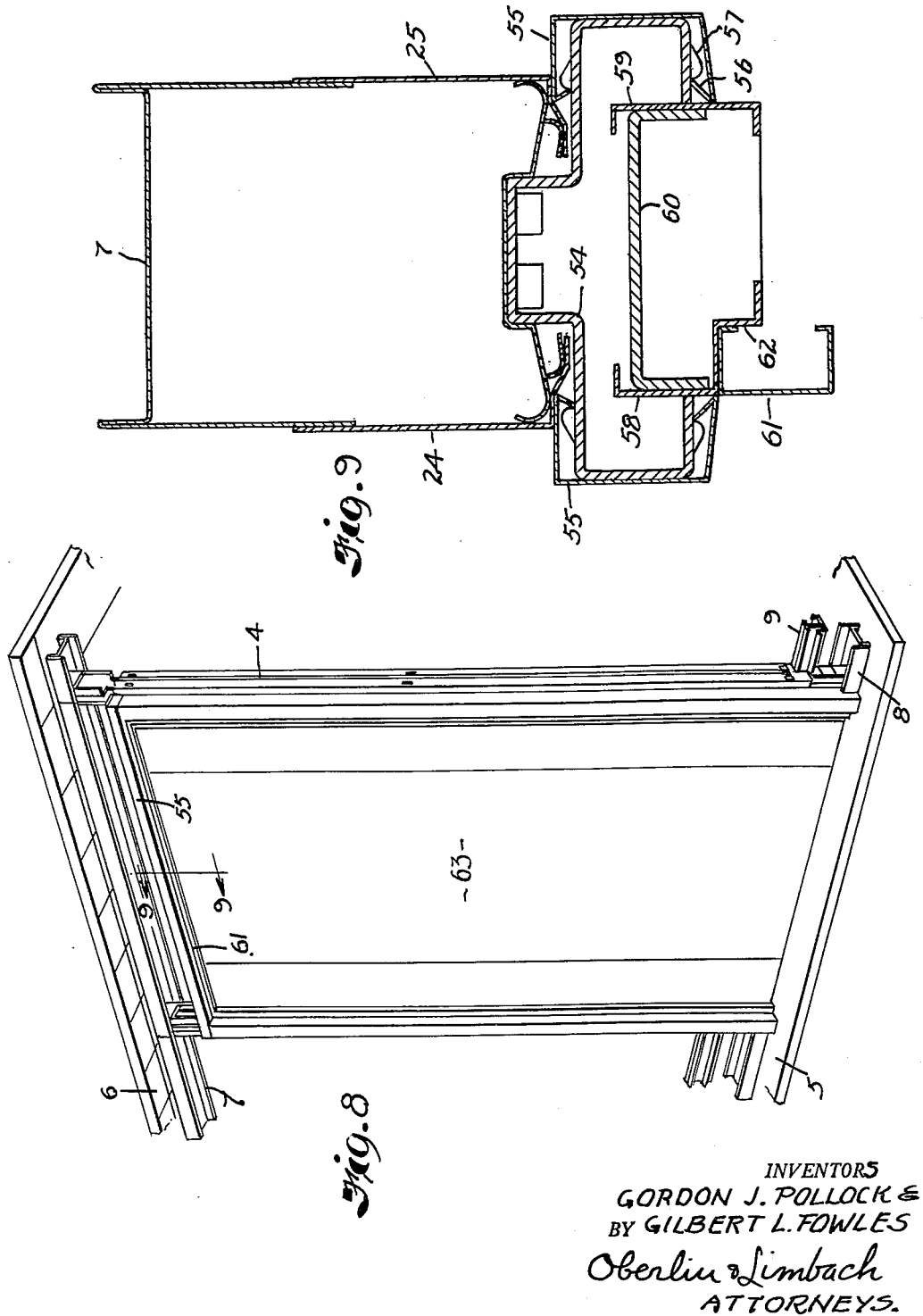
INVENTORS
GORDON J. POLLOCK &
BY GILBERT L. FOWLES
Oberlin & Limbach
ATTORNEYS.

3,099,863
COMPOSITE PANEL ASSEMBLY
Gordon J. Pollock, Parma, and Gilbert L. Fowles, Lakewood, Ohio, assignors to The E. F. Hauserman Company, Cleveland, Ohio, a corporation of Ohio
Filed Jan. 31, 1958, Ser. No. 712,520
5 Claims. (Cl. 20—4)

This invention relates as indicated to a composite panel assembly of a type designed to be employed in the construction of movable partitions for use in office buildings, industrial plants, domestic dwelling houses and the like. More particularly, the invention is concerned with a mode of construction and assembly affording the architect a versatile medium whereby a variety of different physical and ornamental effects may be achieved.

The use of movable partitions and wall panels, more especially steel panels, has become increasingly general not only in large commercial establishments and institutions such as manufacturing plants, laboratories and hospitals, but also in many of the newer and more elaborate office buildings. There is, moreover, an increasing interest in the use of such movable partitions in homes.

Reference may be had to the application of Gordon J. Pollock for U.S. Letters Patent Serial No. 661,669, filed May 27, 1957, "Movable Panel Assembly," not Patent No. 2,943,718, for a description of a new and improved method of mounting side panels of such partitions for ready installment, removal and replacement. Reference may also be had to the application of Gilbert L. Fowles and Gordon J. Pollock for U.S. Letters Patent Serial No. 663,643, filed June 5, 1957, "Partition System," now Patent No. 3,033,330, disclosing another method of installing and mounting the panel members. The panel members of the present invention may be secured to the usual vertical posts in a manner generally similar to that disclosed in such prior applications.

It is an important object of the present invention to provide new and improved means for assembling and interconnecting multiple wall panel members to afford a variety of architectural and ornamental effects.

Another object is to provide means for assembling a variety of different panel elements such as sheet metal wall members and glass or plastic window panes, for example, in a manner which is quick and convenient, facilitating such installation, and which is also ornamental in character.

Still another object is to provide decorative trim for wall panels, window frames, door frames and the like which will be both decorative and also serve to interengage and interlock the several elements together.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawings:

FIG. 1 is a semi-diagrammatic perspective view of a wall partition section between two vertical posts and comprising three vertically stacked individual panel members;

FIG. 5 is a semi-diagrammatic perspective view illustrating the manner in which a large individual glass or plastic pane may be installed;

FIG. 6 is an enlarged fragmentary vertical section taken on the line 6—6 on FIG. 5;

FIG. 7 is an enlarged vertical transverse section taken on the line 7—7 on FIG. 5;

FIG. 8 is a semi-diagrammatic perspective view of a door and door frame assembly embodying certain principles of our invention; and FIG. 9 is a vertical transverse section on an enlarged scale taken on the line 9—9 on FIG. 8.

Figure 2:
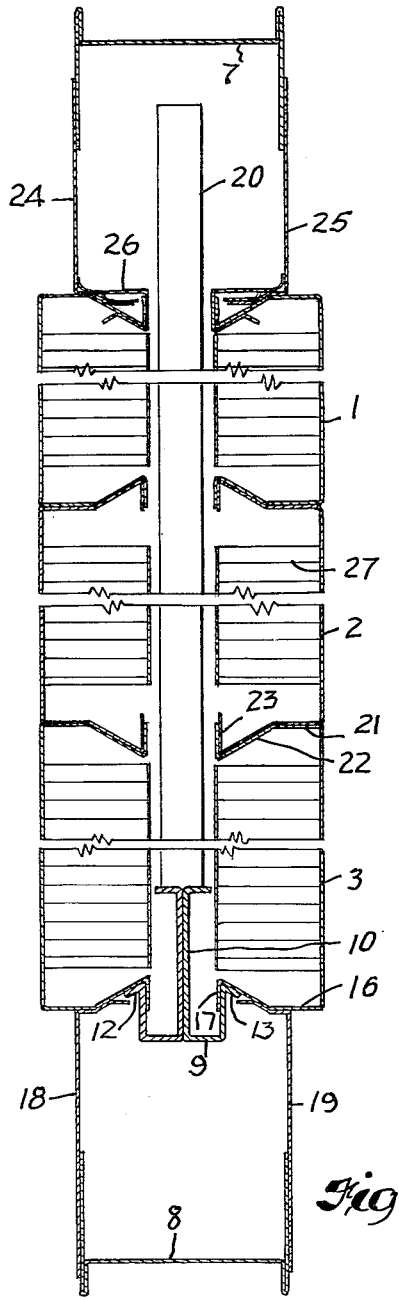
FIG. 2 is a vertical section on a much enlarged scale through the composite panel assembly of FIG. 1.
Figure 3:
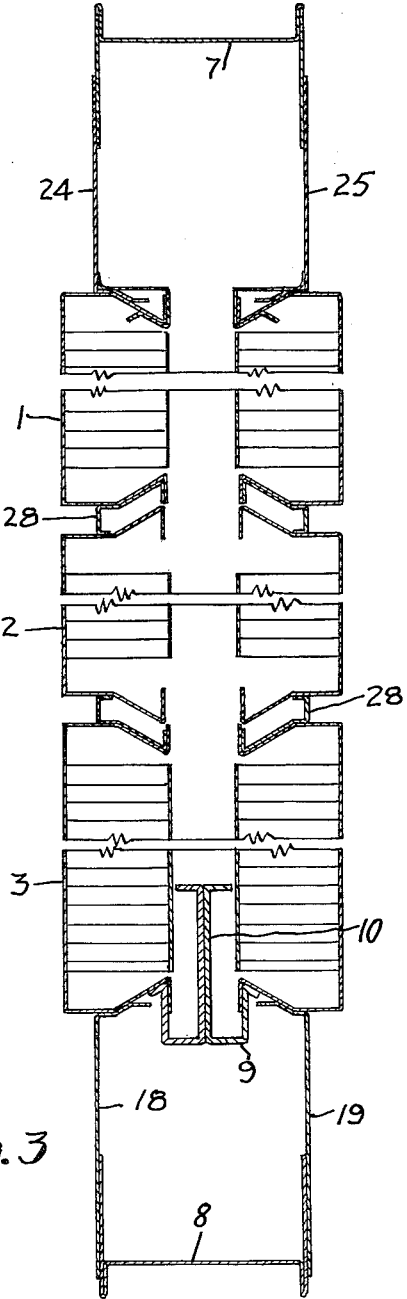
FIG. 3 is a vertical section corresponding to FIG. 2 but illustrating the manner in which decorative spacer elements may be interposed between the successive vertically stacked side panel members.

Referring now more particularly to said drawing and especially FIGS. 1–3 thereof, it will be seen that the partition there illustrated comprises three vertically stacked wall panel members, ordinarily of sheet metal, 1, 2 and 3 secured to vertical posts such as 4 in the manner described in the above-identified prior applications, for example. Such posts extend from the floor 5 to the ceiling 6 engaging an upper channel member 7 and a lower channel member 8. A horizontal rail 9 extends between the posts a short distance above the floor and serves as a support for the lower panel member. Various types of closure strips and the like may be utilized to close the gap between rail 9 and the floor, in well-known manner, and likewise to close the gap between the upper edge of the upper panel 1 and the ceiling 6.

Figure 4:
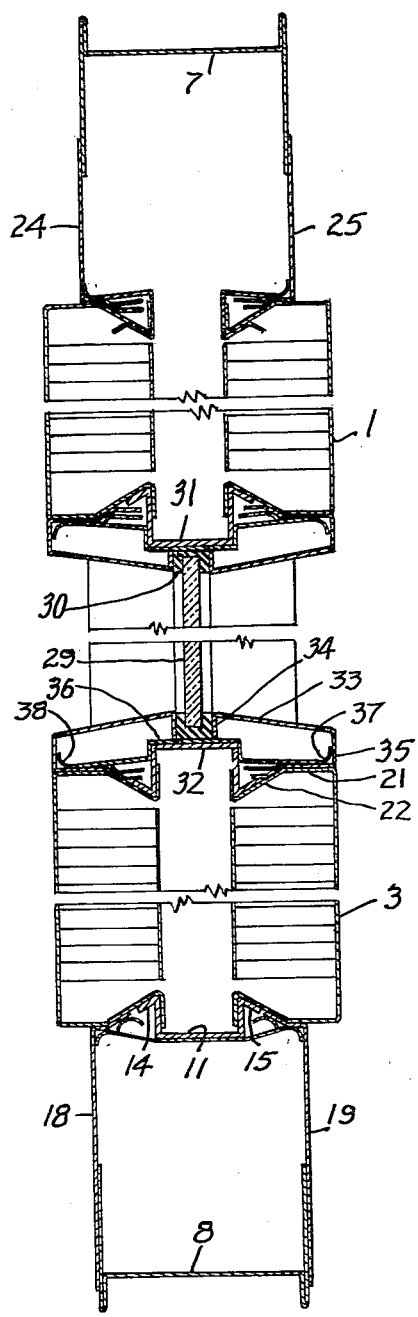
FIG. 4 is a vertical section similar to FIG. 2 but illustrating the manner in which a glass window pane or the like may be substituted for the metal panel.

As shown in FIGS. 2 and 3, the horizontal rail 9 may comprise two like steel members of general J shape cross-section spot welded back to back to form a rigid beam adapted to support the weight of the three panel members 1, 2 and 3 thereon. It will be understood that, as shown, there will ordinarily be two such sets of side panel members, one set constituting each of the sides of the partition. Obviously, the number of such panel members may be varied as desired and they may also be of different vertical extent instead of being of the same vertical extent as shown in FIG. 1. They may also be varied in color, finish and material to make available a wide variety of combinations in order to obtain a desired ornamental or architectural effect. The rail or beam 9 may be considered as comprising a horizontally extending upwardly opening channel which in FIGS. 2 and 3 is provided with a vertically projecting central web 10 having an additional rigidifying effect. However, as shown in FIG. 4, such lower horizontally extending rail may comprise a simple channel 11 without such central upstanding web portion, and in such case will ordinarily be formed of somewhat heavier gauge steel. As shown in each of these figures, the longitudinally extending channel edges or lips will preferably be turned outwardly and downwardly as shown at 12 and 13 in FIG. 2, and 14 and 15 in FIG. 4. In each of the embodiments of the invention illustrated in FIGS. 2–4 inclusive, the lower sheet metal wall panel members 3 are turned inwardly at their lower edges to form a flange 16 normal to the outer vertical ways of the panel and then inclined upwardly at an angle conforming to the inclination of the downturned outwardly projecting channel lip such as 13 in FIG. 2, and then vertically downwardly to afford a terminal downwardly projecting edge portion such as 17 adapted to hook over the channel side of rail 9 as shown. When it is considered that the respective ends of panel member 3 are secured to upstanding posts and that the lower side of the panel member rests upon rail 9 in the manner described and illustrated, it will be appreciated that such lower panel is very securely and rigidly supported. Closure strips such as 18 and 19 may be clipped to the respective sides of the floor channel member 8 to close the gap between the latter and the undersides of the respective panel members 3, the upper edge portions of such closure strips being turned inwardly as shown to conform to the horizontally inwardly projecting lower flanges 16 and the upwardly and inwardly sloping continuations of such flanges. It will thus be apparent that the upper portions of closure strips 18 and 19 are locked against outward withdrawal by such interengagement.

An interior sheet or wall 20 of fire insulating and sound deadening material may be placed in the space between the two sides of the partition, resting upon the lower horizontal rail 9. The upper edge portion of panel 3 corresponds to the lower edge portion, comprising a horizontal inwardly extending flange 21 having a downwardly inclined extension 22, with the final edge portion 23 projecting upwardly parallel to the outer face of the panel member. Panel 1 may be of the same configuration as panel 3, and the upper and lower edge portions of the interposed panel 2 are shaped to be complementary to the respective edge portions of panels 1 and 3 engaged thereby. Consequently, all three panels are locked together in a tongue and groove type of interfit and present a uniform, aligned or coplanar outer face.

The upper spacer or closure strips 24 and 25 which bridge the space between the ceiling channel 7 and the upper edge of the upper panel 1 are of sheet metal and have inturned flanges similar to the upper inturned flanges of the lower closure strips 18 and 19 adapted to conform to the corresponding opposed upper edges of panel members 1. Sheet metal clips such as 26 may be provided which hook under the downwardly sloping upper edge portions of panel members 1 and bear against and position the lower inturned edge portions of strips 24 and 25. The sheet metal panel members will ordinarily be strengthened and rigidified by bonding lightweight sound deadening honeycomb type material 27 to their inner faces in conventional fashion. This will preferably be slightly spaced from the inturned upper and lower edge flanges of the panel members to allow the latter to flex somewhat when they are interfitted.

Referring now more particularly to FIG. 3 of the drawing, spacer strips such as 28 may be interposed between each or some of the adjoining panel members such as 1, 2 and 3 to afford a different ornamental effect. Such spacer strips may be of sheet metal shaped to conform to, and thereby complementary to, the opposed edge portions of the adjoining panel members. They may extend flush with the outer surface of the wall or may be recessed as shown in FIG. 3; alternatively they may project beyond the normal outer wall surface formed by such panel members. As will readily be understood, such spacer strips may be of different material, e.g. stainless steel or aluminum, from the panel members which may be painted in different colors, and thereby afford a variety of strikingly different ornamental effects.

In the embodiment of the invention illustrated in FIG. 4, the upper and lower panel members 1 and 3 are mounted in the manner above described but instead of the interposed central panel 2, a glass pane 29 is installed. Such pane is mounted in a rubber or plastic sealing strip 30 supported against the backs of oppositely opening upper and lower channel members 31 and 32 respectively extending horizontally between the supporting posts. Such channel members are of the same general configuration as lower rail 11 and engage the inturned edge portions of panel members 1 and 3 in the same manner. The sealing strip 30 is held in place by detachable sheet metal trim such as the slightly downwardly sloping sheet metal sill 33 having a downturned inner edge portion 34 adapted to abut against a side of the sealing strip. The outer portion 35 of sill member 33 is turned down flush with the outer surface of panel member 3 and then extends inwardly against the upper surface 21 of the corresponding upper edge portion of panel 3 and then downwardly against the downwardly and inwardly sloping continuation 22 of such panel upper edge portion. A sheet metal retainer strip having a shallow longitudinally extending channel portion 36 conforms to the outer side of channel 32 and is provided with laterally extending wings having upturned outer edge portions 37 and 38. The lower inwardly projecting edge portions of the sill 33 are accordingly clamped in place but may be withdrawn outwardly upon application of sufficient force temporarily resiliently to deform such outer wing portions of sheet metal channel 36. It will thus be appreciated that the several frame members corresponding to sill member 33, both upper and lower, may be snapped into place in the same fashion.

Now referring to FIG. 5 of the drawing, in the embodiment of the invention there illustrated, a large pane of glass 39 (for purposes of illustration only; it will be understood that a sheet of plastic or other selected material might alternatively be employed) fitted in a grooved sealing strip 40 substantially fills the space between a lower rail 41 and an upper rail 42. These two rails may each comprise two channel members spot welded together side by side for enhanced rigidity, the central upstanding portion of upper rail 42 being of T-shaped cross-section as shown to fit and support a sheet metal spring clip member 43 having outwardly projecting side portions such as 44 adapted to overlie and bear against the inwardly projecting lower edge portions of the closure strip such as 25, such latter lower edge portions including a downwardly stepped portion 45 held down by a rebent prong 46 on member 43. Clip 43 may be spot welded to rail 42, and/or held in place by tabs 43a which fit through suitable slots and then may be at least slightly bent. It will thus be apparent that the closure strips 24 and 25 may be snapped into place or removed as desired without disturbing other elements of the assembly.

The lower edges of such closure strips 24 and 25 bear against the upper surface of frame and decorative trim members such as 47 having inturned rebent upper edge portions 48 adapted to hook behind lugs such as 49 struck up from the inturned upper lip portions such as 50 of the channel sides of rail 42. The lower inwardly projecting portion of frame and trim member 47 is turned up as at 51 to bear against the corresponding side of sealing strip 40 and to engage behind downwardly projecting lugs 52 struck down from the bottom of rail 42. Such frame and trim member 47 will ordinarily preferably be of resilient steel strip so formed that it is necessary slightly to increase the spacing between downturned lip portion 48 and upturned lip portion 51 to conform the same to the portion of the rail engaged thereby, thereby ensuring that such frame and trim member firmly resiliently grasps the rail.

As may be seen from an inspection of FIG. 7, the lower closure strips 18 and 19 are secured in place in the same manner as the upper closure strips 24 and 25, and the frame and trim members 53 are likewise of the same configuration and secured in the same manner as the upper members 47.

Referring now to FIGS. 8 and 9 of the drawing showing a doorway with trim and components in accordance with our invention, it will first be noted that the upper closure strips 24 and 25 are secured in place in the same manner as those of FIG. 6 although the upper horizontal frame member or rail 54 is of different configuration in its lower portions, opening downwardly rather than upwardly. The outer frame and trim members 55 correspond closely to similar member 47 of FIG. 6, but with the upturned lower edge portions 56 being bent at acute angles to engage behind lugs 57. The inner bent edges of the trim members 55 abut against the vertical plane surfaces of substantially parallel plate members 58 and 59 respectively which are secured between upper rail portion 54 and lower rail portion 60. A door jamb member 61 fits into an appropriate angular recess 62 in the lower side of member 58, and door 63 is adapted to bear thereagainst in closed position. The door 63 may be mounted in any convenient manner as by hinges. The manner of mounting is not critical to the invention and therefore is not described in detail.

Other forms embodying the features of the invention may be employed, change being made as regards the features herein disclosed, provided those stated by any of the following claims or the equivalent of such features be employed.

We therefore particularly point out and distinctly claim as our invention:

1. In a composite panel assembly having horizontally spaced vertical posts,
   (a) a substantially horizontally disposed beam elevated with respect to the lower terminals of and interconnecting said posts,
   (b) said beam having laterally extending flanges to engage and support a pair of horizontally spaced-apart sets of panel members, said panel members of each set being vertically arranged,
   (c) each set constituting a side of a partition and being separately and individually uspported with respect to the assembly only at a vertical end thereof and in a manner spaced from the free of any contact with the other set substantially throughout its vertical extent,
   (d) at least the bottom panel member of each set having side flanges extending inwardly substantially at right angles to the face of the panel member, then converging together, and finally diverging in a direction substantially parallel to the face of said bottom panel member, the lower of such flanges thereby engaging a laterally extending flange of said beam to support that set, and
   (e) at least one other panel member of each set having side flanges extending inwardly substantially at right angles to the face of said other panel member, then diverging, and finally converging in a direction substantially parallel to the face of said other panel member,
   (f) the lower flange of said other panel member thereby nesting with the upper flange of said bottom panel member to interengage the panel members.

2. The panel assembly of claim 1 further including closure members contacting the end panel members of each set and extending in opposite directions to close off the lateral area of the assembly.

3. The panel assembly of claim 1 further including accoustical insulation disposed between said two sets of panel members.

4. The panel assembly of claim 1 further including a spacer strip interposed between the adjacent flanges of two adjoining panel members of the same set, said spacer strip having one portion conformed to the shape of one of said flanges and a further portion effective to engage and space vertically the other of said adjacent flanges from said one flange.

5. The assembly of claim 2 further including clip means holding together said closure members and top-most panel members.

References Cited in the file of this patent

UNITED STATES PATENTS

| | | |
|---|---|---|
| 887,912 | Bokor | May 19, 1908 |
| 1,183,607 | Torjesen | May 16, 1916 |
| 1,285,728 | Kalla | Nov. 26, 1918 |
| 1,575,705 | Oberdorfer | Mar. 9, 1926 |
| 1,585,137 | Weber | May 18, 1926 |
| 1,450,733 | Reaugh | Apr. 3, 1928 |
| 2,097,484 | Winslow | Nov. 2, 1937 |
| 2,169,273 | Mills | Aug. 15, 1939 |
| 2,205,730 | Morgan | June 25, 1940 |
| 2,394,146 | Brunton | Feb. 5, 1946 |
| 2,582,765 | Brew | Jan. 15, 1952 |
| 2,815,542 | Baker | Dec. 10, 1957 |
| 2,823,433 | Kendall | Feb. 18, 1958 |
| 2,867,856 | Codini | Jan. 13, 1959 |
| 2,874,420 | Henderson | Feb. 24, 1959 |

FOREIGN PATENTS

| | | |
|---|---|---|
| 210,208 | Great Britain | Jan. 31, 1924 |